United States Patent
Gross et al.

(10) Patent No.: US 10,563,023 B2
(45) Date of Patent: Feb. 18, 2020

(54) CARBON FIBER COMPOSITE, A MEDIUM INCORPORATING THE CARBON FIBER COMPOSITE, AND A RELATED METHOD

(71) Applicant: The Boeing Company, Chicago, IL (US)

(72) Inventors: Gwen Marie Lanphere Gross, Redmond, WA (US); Lori Nelson Blair, Enumclaw, WA (US); Deborah Ann Taege, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 6 days.

(21) Appl. No.: 15/639,745

(22) Filed: Jun. 30, 2017

(65) Prior Publication Data

US 2018/0057646 A1    Mar. 1, 2018

Related U.S. Application Data

(60) Provisional application No. 62/380,349, filed on Aug. 26, 2016.

(51) Int. Cl.

| | |
|---|---|
| *C08J 5/00* | (2006.01) |
| *C08J 5/04* | (2006.01) |
| *B01J 20/20* | (2006.01) |
| *B01D 39/04* | (2006.01) |
| *B01J 20/28* | (2006.01) |
| *C02F 1/28* | (2006.01) |
| *B01D 39/20* | (2006.01) |
| *B01D 39/14* | (2006.01) |
| *B01D 39/16* | (2006.01) |
| *C08L 95/00* | (2006.01) |

(52) U.S. Cl.
CPC .............. *C08J 5/042* (2013.01); *B01D 39/04* (2013.01); *B01D 39/14* (2013.01); *B01D 39/16* (2013.01); *B01D 39/2055* (2013.01); *B01D 39/2065* (2013.01); *B01J 20/20* (2013.01); *B01J 20/28038* (2013.01); *C02F 1/288* (2013.01); *C08L 95/00* (2013.01); *B01D 2239/0492* (2013.01); *C02F 1/281* (2013.01); *C02F 1/283* (2013.01); *C08J 2363/00* (2013.01); *C08L 2555/32* (2013.01); *C08L 2555/50* (2013.01); *C08L 2555/80* (2013.01)

(58) Field of Classification Search
CPC ........... C08J 5/042; C08L 95/00; C02F 1/288; B01D 39/04; B01D 39/14; B01D 39/16; B01D 39/2055
USPC .......................................................... 523/205
See application file for complete search history.

(56) References Cited

U.S. PATENT DOCUMENTS

| | | | |
|---|---|---|---|
| 5,271,917 A | 12/1993 | Hoffman | |
| 7,296,576 B2 * | 11/2007 | Ait-Haddou | ........... B82Y 30/00 |
| | | | 524/501 |
| 2011/0237422 A1 | 9/2011 | Incorvia et al. | |

FOREIGN PATENT DOCUMENTS

| | | |
|---|---|---|
| JP | 2003/239171 | 8/2003 |
| WO | WO 96/36665 | 11/1996 |
| WO | WO 03/016048 | 2/2003 |

OTHER PUBLICATIONS

Battleson, K.A., "Surface Characterization of Pan-Based Carbon Fibers Using XPS, SIMS, and AFM," Thesis, Montana State University-Bozeman, Aug. 1998.
Forta Corporation, FRP—Fiber Reinforced Pervious [Brochure], Grove City, PA.
Oya, A., et al., "Antibacterial Activated Carbon Fiber Derived from Phenolic Resin Containing Silver Nitrate," *Carbon*, 1993, vol. 31(1), pp. 71-73.
Oya, A., et al., "Preparation and Properties of an Antibacterial Activated Carbon Fiber Containing Mesopores," *Carbon*, 1996, vol. 34(1), pp. 53-57.

* cited by examiner

*Primary Examiner* — Hannah J Pak
(74) *Attorney, Agent, or Firm* — Womble Bond Dickinson (US) LLP

(57) ABSTRACT

Carbon fiber composite additives, media incorporating the carbon fiber composites, and related methods are provided herein. In some aspects, a composition includes at least one medium; and a carbon fiber composite incorporated with the at least one medium, the carbon fiber composite including one or more carbon fibers with an epoxy resin matrix applied thereto to produce a composition having improved characteristics and filtration performance.

17 Claims, 2 Drawing Sheets

Figure 1:
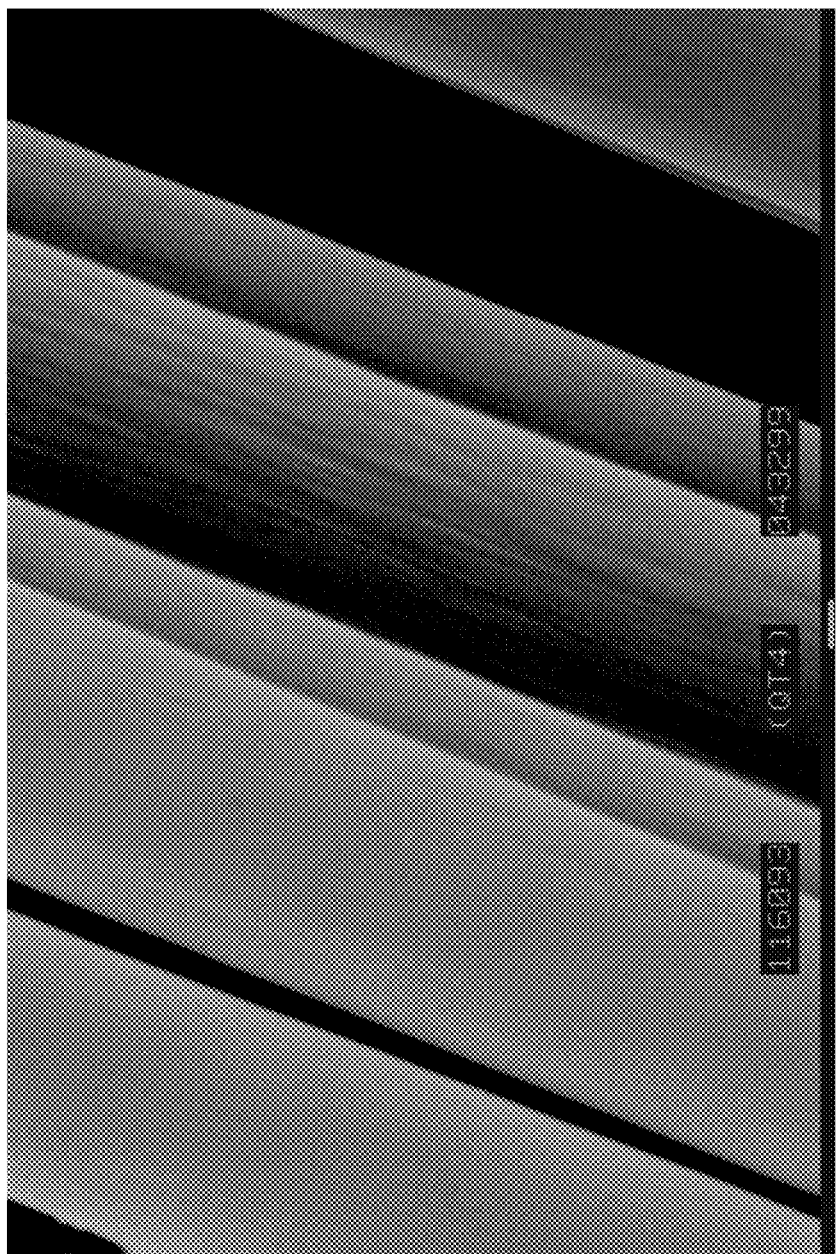

CARBON FIBER COMPOSITE, A MEDIUM INCORPORATING THE CARBON FIBER COMPOSITE, AND A RELATED METHOD

CROSS-REFERENCE TO RELATED APPLICATIONS

The present application claims priority to U.S. Provisional Patent Application No. 62/380,349, entitled: A Carbon Fiber Composite, a Medium Incorporating the Carbon Fiber Composite, and a Related Method, filed on Aug. 26, 2016.

TECHNOLOGICAL FIELD

The present disclosure relates generally to carbon fiber composites. More particularly, the present disclosure relates to carbon fiber composite additives, media incorporating the carbon fiber composites, and related methods.

BACKGROUND

Cured carbon fiber composite material (CCFCM) retains some of the mechanical performance properties of a 'pristine' carbon fiber, i.e., a carbon fiber without an epoxy resin matrix incorporated therein. In order to repurpose the CCFCM while still retaining these mechanical performance properties, costly chemical processes are needed to reduce the CCFCM fibers to a minimum fiber size and treat the surface of the fiber to separate it from the matrix; thereby negating much of the environmental benefit for repurposing the CCFCM.

Accordingly, it is desirable for carbon fiber composite additives, media incorporating the carbon fiber composites, and related methods that are able to be repurposed without the need for expensive treatment processes, are non-toxic, and reduce environmental impact.

BRIEF SUMMARY

Example implementations of the present disclosure are directed to a carbon fiber composite additive, a composition of a medium incorporating the carbon fiber composite, and a related method for making the composition. Example implementations of the composition of the medium including the carbon fiber composite provide improved performance in pervious pavement in terms of durability, wear, workability during placement, and variability. The pervious pavement may comprise a pervious concrete or a porous asphalt. Other example implementations of the composition of the medium including the carbon fiber composite provide improved performance in filtration systems, such as jet fuel filtration systems.

The present disclosure thus includes, without limitation, the following example implementations.

Some example implementations provide a carbon fiber composite additive comprising one or more carbon fibers with an epoxy resin matrix applied thereto.

In some example implementations of the carbon fiber composite additive of the preceding or any subsequent example implementation, or any combination thereof, the one or more carbon fibers comprise a polyacrylonitrile (PAN)-type carbon fiber, and wherein the epoxy resin matrix comprises at least one of a thermoplastic resin and an epoxy resin.

In some example implementations of the carbon fiber composite additive of any preceding or any subsequent example implementation, or any combination thereof, the carbon fiber composite further comprises a mesoporous material.

In some example implementations of the carbon fiber composite additive of any preceding or any subsequent example implementation, or any combination thereof, the one or more carbon fibers comprise an interior structure having randomly folded basal planes.

In some example implementations of the carbon fiber composite additive of any preceding or any subsequent example implementation, or any combination thereof, the one or more carbon fibers with an epoxy resin matrix applied thereto is separated into different particle size fractions.

In some example implementations of the carbon fiber composite additive of any preceding or any subsequent example implementation, or any combination thereof, the different particle size fractions comprise about 21.1 percent, about 30.1 percent, and about 48.6 percent relative to a weight by volume percentage of a composition incorporating the carbon fiber composite and at least one medium.

Some example implementations provide a composition comprising at least one medium; and a carbon fiber composite incorporated with the at least one medium, the carbon fiber composite comprising one or more carbon fibers with an epoxy resin matrix applied thereto to produce a composition having improved characteristics and filtration performance.

In some example implementations of the composition of the preceding or any subsequent example implementation, or any combination thereof, the improved characteristics of the composition are improved relative to a composition including a medium devoid of a carbon fiber composite.

In some example implementations of the composition of any preceding or any subsequent example implementation, or any combination thereof, the composition is utilized for sporting goods, automotive, and non-structural aerospace parts applications where improved filtration performance is desired.

In some example implementations of the composition of any preceding or any subsequent example implementation, or any combination thereof, the carbon fiber composite is a cured carbon fiber composite material (CCFCM).

In some example implementations of the composition of any preceding or any subsequent example implementation, or any combination thereof, the carbon fiber composite is configured to be refined into different particle size fractions relative to a weight by volume percentage of the composition.

In some example implementations of the composition of any preceding or any subsequent example implementation, or any combination thereof, a carbon fiber content of the different particle size fractions relative to the weight by volume percentage of the composition is modified in correspondence with a desired filtration performance.

In some example implementations of the composition of any preceding or any subsequent example implementation, or any combination thereof, at least one medium comprises clay, cellulose, sand, peat moss, perlite, glass beads, zeolite, concrete, or asphalt.

In some example implementations of the composition of any preceding or any subsequent example implementation, or any combination thereof, at least the one or more carbon fibers with the epoxy resin matrix applied thereto of the carbon fiber composite is incorporated with the at least one medium in one or more sizes and one or more quantities to reduce known pollutant concentrations in a specimen to below a standard benchmark level.

In some example implementations of the composition of any preceding or any subsequent example implementation, or any combination thereof, the one or more carbon fibers with the epoxy resin matrix applied thereto of the carbon fiber composite are incorporated with the at least one medium in a defined weight by volume percentage of the total composition to reduce known pollutant concentrations in a specimen to below a standard benchmark level.

In some example implementations of the composition of any preceding or any subsequent example implementation, or any combination thereof, the composition has improved filtration performance dependent on one or more of a surface area of the one or more carbon fibers of the carbon fiber composite, a flow rate of fluid flowing through the composition, a pH of the fluid, a molecular weight of a contaminant entrained in the fluid, and a molecular size of the contaminant.

Some example implementations provide a method for making a composition comprising providing at least one medium; and incorporating a carbon fiber composite with the at least one medium, the carbon fiber composite comprising one or more carbon fibers with an epoxy resin matrix applied thereto to produce a composition having improved characteristics and filtration performance.

In some example implementations of the method of the preceding or any subsequent example implementation, or any combination thereof, the method further comprises refining the one or more carbon fibers with the epoxy resin matrix applied thereto of the carbon fiber composite into different particle size fractions relative to a weight by volume percentage of the composition.

In some example implementations of the method of the preceding or any subsequent example implementation, or any combination thereof, providing the at least one medium comprises providing at least one of clay, cellulose, sand, peat moss, perlite, glass beads, zeolite, concrete, or asphalt.

In some example implementations of the method of the preceding or any subsequent example implementation, or any combination thereof, incorporating the carbon fiber composite with the at least one medium to produce the composition having improved characteristics and filtration performance comprises producing the composition having improved characteristics relative to a composition including a medium devoid of a carbon fiber composite.

The features, functions and advantages discussed herein may be achieved independently in various example implementations or may be combined in yet other example implementations further details of which may be seen with reference to the following description and drawings.

BRIEF DESCRIPTION OF THE DRAWING(S)

Figure 2:
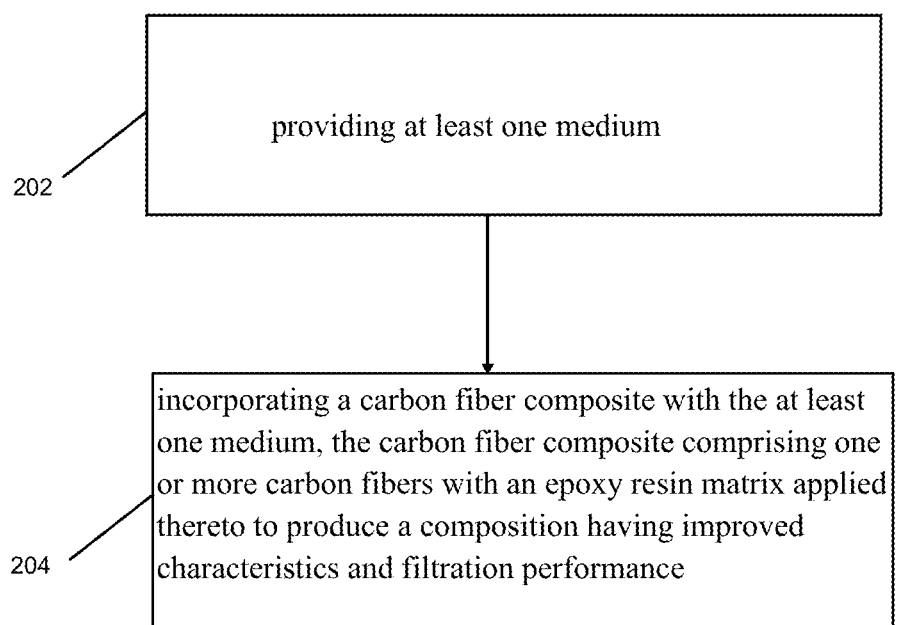

Having thus described example implementations of the disclosure in general terms, reference will now be made to the accompanying drawings, which are not necessarily drawn to scale, and wherein:

FIG. 1 illustrates randomly folded basal planes on a fiber interior of a carbon fiber composite additive according to some example implementations of the present disclosure; and FIG. 2 is a flowchart illustrating various steps in a method for making a composition according to some example implementations of the present disclosure.

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Something may be described as being above something else (unless otherwise indicated) may instead be below, and vice versa; and similarly, something described as being to the left of something else may instead be to the right, and vice versa. Also, for example, reference may be made herein to quantitative measures, values, relationships or the like (e.g., planar, coplanar, perpendicular). Unless otherwise stated, any one or more if not all of these may be absolute or approximate to account for acceptable variations that may occur, such as those due to engineering tolerances or the like. Like reference numerals refer to like elements throughout.

A carbon fiber composite additive, a composition of a medium incorporating the carbon fiber composite, and a related method for making the composition are disclosed herein. The carbon fiber composite additive comprises a cured carbon fiber composite material (CCFCM) including one or more carbon fibers and an epoxy resin matrix configured to be added to the one or more carbon fibers. In some examples, the CCFCM comprises polyacrylonitrile (PAN)-type carbon fibers, a thermoplastic resin, and an epoxy resin in varying percentages by weight of the total CCFCM; although the CCFCM may additionally comprise fiberglass, aluminum, and/or titanium.

The carbon fibers having an epoxy resin matrix material applied thereto of the CCFCM include intermediate modulus (IM) carbon fibers having nominally about, for example, a 265 GPa to about a 320 GPa tensile modulus and/or having about 4.0 GPa to about 5.8 GPa tensile strength. Specifically, as used herein, the IM carbon fibers included in the CCFCM are, for example, aerospace grade IM carbon fibers. Typically, aerospace grade IM carbon fibers are not normally used in filtration applications due to the high costs associated therewith; however, the use of repurposed aerospace grade IM carbon fibers bridges that price gap for filtration applications with the additional benefits targeted elsewhere. Examples of common aerospace grade IM carbon fibers include T800 commercially available from TORAY INDUSTRIES, INC., IM7 commercially available from HEXCEL®, IMS65 commercially available from Toho Tenax, T650 commercially available from Cytec Solvay Group, etc.

By comparison, "pristine" carbon fibers (i.e., carbon fibers without an epoxy resin matrix incorporated therein) do not benefit from the advantages resulting from the incorporation of an epoxy resin matrix. More particularly, the pristine carbon fibers lack increased reactive sites and water uptake as compared to the carbon fiber composite disclosed herein. In some instances, an epoxy resin matrix comprises thermoplastics, such as polyethersulfone and polyamides.

Repurposing the carbon fibers with the epoxy resin matrix applied thereto of the CCFCMs for alternative applications provides an additional value stream for a material whose production is increasing significantly, but which does not currently have well developed repurposing paths. For those applications already implementing CCFCMs including carbon fibers with the epoxy resin matrix applied thereto, multifunctional properties such as water filtration or static dissipation provide additional value because at least some of the length of the carbon fiber structure and thus the mechanical performance associated therewith is maintained by the CCFCMs. Additionally, CCFCMs have resin particulates present that may provide additional active sites for filtration.

A refined CCFCM can function as a filtration system when encapsulated within another medium, e.g., a permeable pavement composition. For example, the CCFCM is added directly to at least one medium without additional care for maintaining surface reactivity or surface area. The nature of the carbon fiber structure of the carbon fibers with the epoxy resin matrix applied thereto of the CCFCM provides the mechanism for filtration performance. In some instances, filtration is achieved at only a minimal loading of about one to about two percent.

Typical filtration performance utilizing CCFCM, either by itself or encapsulated within a medium such as a permeable pavement composition, includes improving a quality of water or other fluid passed therethrough by the CCFCM removing any contaminants (i.e., pollutants, sediments, toxins, etc.) therefrom. Such filtration performance is attributable to the fluid being in intimate contact with the CCFCM, which is known to provide filtration performance dependent on at least one or more of, but not limited to, a surface area of the one or more carbon fibers of the carbon fiber composite, a flow rate of fluid flowing through the composition, a pH of the fluid, a molecular weight of a contaminant entrained in the fluid, and a molecular size of the contaminant. More particularly, for the contaminants to be filtered from the fluid, it is desirable for the contaminant to contact at least a surface of the CCFCM. In this manner, reduction in porosity and an increase in filtration rate using CCFCM helps to increase filtration performance.

In other example implementations, a CCFCM functions as a filtration system when included in a jet fuel filtration system to filter out sediments or heavier and unwanted fuels (e.g., diesel). Other filtration applications that may benefit from inclusion of CCFCMs include, for example, storm water collection and sampling applications, particularly in urban or laboratory environments that provide exemplary settings for storm water collection, sampling, etc. Regardless, when included in any type of filtration application, the CCFCMs described herein are advantageously non-toxic to any aquatic, semi-aquatic, or land-dwelling organisms exposed thereto.

In some example implementations (e.g., permeable pavement applications or filtration), the one or more carbon fibers with the epoxy resin matrix applied thereto of the CCFCMs have undergone a refining process. For the purposes of this disclosure, when referring to the refining or repurposing process, refinement or repurposing specifically refers to refining of the one or more carbon fibers with a matrix applied thereto of the CCFCM into discrete elements, even smaller particle size fractions, etc.

For example, the CCFCMs are first refined to remove the coarsest elements using a mechanical separation process. Shredding and then hammer-milling the carbon fibers with the epoxy resin matrix applied thereto of the CCFCM into discrete elements through about a 25.4-mm screen is one such mechanical process, but other processes can be used to separate the CCFCM into discrete elements. Subsequently, once initially processed, the CCFCM elements can be further processed in order to refine the carbon fibers with the epoxy resin matrix applied thereto of the CCFCM into different particle size fractions relative to a weight by volume percentage of the composition (i.e., of the total composition of the CCFCM and the medium).

The carbon fibers with the epoxy resin matrix applied thereto of the CCFCM are differentiated into four particle size fractions by further mechanical screening or an equivalent process, e.g., large particles are considered as those passing through a 6 mesh and retained in a 10 mesh, medium particles are those passing through a 10 mesh and retained in a 20 mesh, small particles are those passing through a 20 mesh and retained in a pan, and combined particles are those passing through a 6 mesh and retained in the pan. In another exemplary aspect, the carbon fibers with the epoxy resin matrix applied thereto of the CCFCM are differentiated into two, three, five, six, seven, or more different particle size fraction through a variety of different sized mesh screens or any other mechanical screening or any other equivalent process.

Each different particle size fraction thus contains a carbon fiber content relative to a weight by volume percentage of the composition. In one exemplary aspect, the combined particle size fraction relative to a weight by volume percentage of the composition is about a 60.8% total hammermill carbon fiber with the epoxy resin matrix applied thereto passed through a 6 mesh screen. Within that fraction, the large particle size CCFCM elements are about 21.1%, the medium particle size CCFCM elements are about 30.1%, and the small particle size CCFCM elements are about 48.6%. In this instance, the highest carbon fiber content is present in the small particle size fraction (pass 20 mesh), the lowest carbon fiber content is present in the medium particle size fraction (pass 10 mesh), and the medium carbon fiber content is present in the large particle size fraction (pass 6 mesh). As such, by modifying the carbon fiber content relative to a weight by volume percentage of the composition (e.g., by material and/or particle size fraction of the CCFCM) the characteristics of the composition are modifiable as desired, e.g., the filtration rate of the composition is modifiable depending on the particulates filtered using the composition.

In some aspects, modifying the filtration rate as described herein may impact other characteristics of the composition (e.g., porosity, split tensile strength, compressive strength, modulus of elasticity). In such instances, balancing the filtration rate against other characteristics is specific to each circumstance and is also dependent on the at least one medium in which the carbon fiber composite is incorporated. However, an overall improvement in at least porosity, infiltration rate, split tensile strength, compressive strength, or modulus of elasticity of the composition results merely from incorporating a carbon fiber composite in at least one medium, which is variable as loading of the carbon fiber composite changes. Accordingly, the improved characteristics of the composition incorporating a carbon fiber composite into the medium are improved relative to a composition including a medium devoid of a carbon fiber composite such as CCFCM. Consequently, it should be apparent that refining of the carbon fibers with the epoxy resin matrix applied thereto of the CCFCM may be accomplished in a manner that depends on the carbon fiber content desired for inclusion in a particular medium. More particularly, CCFCM element particles that pass through a 20 mesh may be incorporated into medium where a high carbon fiber content is desired. While one example of refining CCFCMs has been outlined above, it is not meant to limit the ways refining of CCFCMs is achievable. Other forms of or processes for resizing CCFCMs may be used and do not depart from the scope of the present disclosure.

The CCFCM (i.e., the refined carbon fibers with the epoxy resin matrix applied thereto particles and/or unrefined carbon fibers with the epoxy resin matrix applied thereto) is configured to be incorporated with a medium in order to enhance filtration properties of that medium, as well as other characteristics of the medium. The medium may include clay, cellulose, sand, peat moss, perlite, glass beads, zeolite, concrete, asphalt, etc. As noted above, the CCFCM may be refined prior to combination with the medium, for example, using a shredding and/or hammer mill. As a result of the refining process, the CCFCM may comprise CCFCM element particles (i.e., fibers with the epoxy resin matrix applied thereto) that may have their physical structures altered in a manner that improves filtration of fluids, gases, solids, etc. More particularly, in one example, randomly folded basal planes on a fiber interior of each CCFCM element particle, as well as a microporous surface that results from a surface treatment (e.g., curing), improves filtration because, as compared to granulated or particulate carbon species, the fiber interior of each CCFCM element particle has a large exterior surface area relative to a fiber volume, while a crystalline nature of the fiber interior provides a mesoporous structure that results in increased absorptivity. FIG. 1 illustrates an interior 100 of a refined CCFCM element particle, where randomly folded basal planes have resulted. As used herein, "randomly folded basal planes" refers to an internal and/or a surface crystalline structure of the CCFCM element particle, where a graphitic basal plane is generally oriented in a radial direction of the CCFCM element particle. For example, a highly molecular orientation of a PAN precursor polymeric upon graphitization results in randomly folded basal planes.

The CCFCM comprises at least one mesoporous material (i.e., a material having pores with diameters substantially between about 2 nm and about 50 nm), where such additional materials may provide enhanced filtration abilities. A CCFCM comprising at least one mesoporous material provides enhanced filtration abilities because the pore size of the filtration material dictates the physical screening size in regards to the ability of the system to capture and retain molecular or biological elements in a given size range. The molecular size of common water or other fluid contaminants can vary from sub-nanometer to sub-micrometer. The nanometer range and smaller is the most difficult to capture typically for a filtration system so the inclusion of a media containing pores in that size range allows for physical segregation as well as increasing surface area of the media.

For loading of CCFCM element particles in a matrix material, a very low percent (e.g., more than about zero percent by weight or about one to about two percent by weight) may be desirable. Notably, the addition of any material to a system can result in changes in physical and mechanical properties to that system, thus the desire to add a minimal amount of a material and still achieve a homogenous yet random distribution that provides the noted benefit(s) is desirable. As such, for example, a loading of about two percent by weight for a high aspect ratio particulate such as CCFCM is desirable.

Alternatively, for mechanical applications with the potential for filtration applications, the mechanical loading for CCFCM element particles can be about 35 to about 45 percent by weight. For a carrier mat or other application where the CCFCM element particles are the primary component, loading can be about 99 percent by weight or more. These systems can have a small amount of binder. The carbon fiber surface should be accessible by the fluid being filtered whether it is actually open or if it is in a matrix that can easily let the fluid pass through and be exposed to the CCFCM element particles.

It can be desirable to introduce CCFCM element particles of one or more sizes and one or more quantities to a medium in order to reduce known pollutant concentrations to below a standard benchmark level. For example, a CCFCM comprising one or more one or more carbon fibers and an epoxy resin matrix is configured to be added to a medium in a defined weight by volume percentage of the total composition of the CCFCM and the medium (e.g., about 10 to about 50 percent) in order to reduce the known pollutant concentrations. Exemplary pollutants collectable in lab-water and/or urban-collected storm water specimens are Copper, Zinc, Polycyclic Aromatic Hydrocarbons (PAHs), Lead, Arsenic, Cadmium, Mercury, Petroleum Hydrocarbons (Diesel Fraction), Total Suspended Solids (TSS), and Kerosene. Other pollutants not listed, but otherwise known, are also contemplated.

One example approach for evaluating a potential water quality improvement (i.e., a reduction in known pollutant concentrations to below the standard benchmark level) is to evaluate a potential to sequester the pollutants in collected specimens (e.g., collected lab-water and/or urban-collected storm water) and then perform additional testing with multiple pollutants and different CCFCM element particle sizes.

FIG. 2 is a flowchart illustrating various steps in a method 200 for making a composition, such as that described above. As shown at 202 and 204, the method includes providing at least one medium, and incorporating a carbon fiber composite with the at least one medium, the carbon fiber composite comprising one or more carbon fibers with an epoxy resin matrix applied thereto to produce a composition having improved characteristics and filtration performance.

In some example implementations, the method further comprises refining the one or more carbon fibers with the epoxy resin matrix applied thereto of the carbon fiber composite into different particle size fractions relative to a weight by volume percentage of the composition.

Further examples of testing and analysis using CCFCMs as described herein are provided below. These examples are merely exemplary and are meant to provide practical testing applications of using CCFCMs.

Example 1

A water toxicology assessment was performed using prepared media. The prepared media included a permeable composition (e.g., pervious concrete and porous asphalt), each including a quantity of refined CCFCMs as an additive, as well as pervious concrete and porous asphalt without the additive. Each of the prepared media was evaluated on daphnids.

With the control specimens and the composition including the pervious concrete media with the CCFCM additive specimens, all daphnids exposed to the clean water infiltration procedure died within the first 48 hours.

Specimens including porous asphalt media with the CCFCM additive were tested. The addition of CCFCM to the porous asphalt medium appeared to prevent toxicity from the leached water. A 100% daphnids survival rate was observed with the porous asphalt medium with the CCFCM additive, compared to a 63% survival rate with the control porous asphalt without an additive. These results show a potential for the CCFCMs to mitigate toxins and other pollutants. The same result was found with road runoff (collected storm water), where the porous asphalt media with the CCFCM additive had a higher survival rate than the control porous asphalt, a 24% and 2.5% survival rate, respectively.

Example 2

Adsorption jar testing was performed using kerosene and a quantity of refined CCFCM element particles to investigate the potential of CCFCM element particles to improve water quality. Results from the jar testing indicated that the addition of the CCFCM element particles potentially adsorbed organic compounds and improved water quality. Additionally, tests were performed to determine whether the CCFCM element particles are toxic to the water flea, *Ceriodaphnia dubia*, which is commonly used to determine water toxicity for aquatic life. Results were favorable and indicated that the CCFCM element particles were unlikely to be toxic to aquatic life.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A composition comprising:
    at least one medium; and
    a carbon fiber composite incorporated with the at least one medium, the carbon fiber composite comprising one or more carbon fibers with an epoxy resin matrix applied thereto to produce a composition having improved characteristics, wherein the improved characteristics of the composition are improved relative to a composition including a medium devoid of the carbon fiber composite,
    wherein the one or more carbon fibers with the epoxy resin matrix applied thereto are refined into different particle size fractions relative to a weight by volume percentage of the composition and a carbon fiber content of the different particle size fractions is relative to the weight by volume percentage of the composition.

2. The composition according to claim 1, wherein the composition is utilized for sporting goods, automotive, and non-structural aero parts applications.

3. The composition according to claim 1, wherein the carbon fiber composite is a cured carbon fiber composite material (CCFCM).

4. The composition according to claim 1, wherein the at least one medium comprises clay, cellulose, sand, peat moss, perlite, glass beads, zeolite, concrete, or asphalt.

5. The composition according to claim 1, wherein the composition's filtration performance is dependent on one or more of a surface area of the one or more carbon fibers of the carbon fiber composite, a flow rate of fluid flowing through the composition, a pH of the fluid, a molecular weight of a contaminant entrained in the fluid, and a molecular size of the contaminant.

6. A method for making the composition according to claim 1, the method comprising:
    providing at least one medium; and
    incorporating a carbon fiber composite with the at least one medium, the carbon fiber composite comprising one or more carbon fibers with an epoxy resin matrix applied thereto to produce a composition having improved characteristics, wherein the improved characteristics of the composition are improved relative to a composition including a medium devoid of the carbon fiber composite,
    wherein the one or more carbon fibers with the epoxy resin matrix applied thereto are refined into different particle size fractions relative to a weight by volume percentage of the composition and
    a carbon fiber content of the different particle size fractions is relative to the weight by volume percentage of the composition.

7. The method according to claim 6, wherein providing the at least one medium comprises providing at least one of clay, cellulose, sand, peat moss, perlite, glass beads, zeolite, concrete, or asphalt.

8. The composition according to claim 1, wherein the one or more carbon fibers comprise a polyacrylonitrile (PAN) carbon fiber.

9. The composition according to claim 1, wherein the carbon fiber composite further comprises a mesoporous material.

10. The method according claim 6, wherein incorporating the carbon fiber composite, wherein the carbon fiber composite is a cured carbon fiber composite material (CCFCM), with the at least one medium.

11. The method according to claim 6, wherein incorporating the carbon fiber composite comprises incorporating the carbon fiber composite with the at least one medium to produce the composition having a filtration performance dependent on one or more of a surface area of the one or more carbon fibers of the carbon fiber composite, a flow rate of fluid flowing through the composition, a pH of the fluid, a molecular weight of a contaminant entrained in the fluid, and a molecular size of the contaminant.

12. The method according to claim 6, wherein incorporating the carbon fiber composite, wherein the carbon fiber composite further comprises a mesoporous material, with the at least one medium.

13. The composition according to claim 1, wherein the epoxy resin matrix comprises at least a thermoplastic resin or an epoxy resin.

14. The composition according to claim 1, wherein the one or more carbon fibers comprise an interior structure having randomly folded basal planes.

15. The method according to claim 6, wherein incorporating the carbon fiber composite with the at least one medium comprises incorporating at least a thermoplastic resin or an epoxy resin into the at least one medium.

16. The method according to claim 6, wherein incorporating the carbon fiber composite with the at least one medium comprises incorporating the one or more carbon fibers comprising an interior structure having randomly folded basal planes with the at least one medium.

17. The method according to claim 6, wherein incorporating the carbon fiber composite with the at least one medium comprises incorporating the one or more carbon fibers comprising a polyacrylonitrile (PAN) carbon fiber with the at least one medium.

\* \* \* \* \*